United States Patent [19]

Koerber et al.

[11] 4,224,463

[45] Sep. 23, 1980

[54] DUAL WIRE HOSE

[75] Inventors: Marvin A. Koerber, Abbeville;
Thomas A. Kutnyak, Greenwood,
both of S.C.

[73] Assignee: Automation Industries, Inc.,
Greenwich, Conn.

[21] Appl. No.: 958,994

[22] Filed: Nov. 9, 1978

[51] Int. Cl.³ .......................... A47L 9/24; F16L 11/11
[52] U.S. Cl. ..................................... 174/47; 138/122;
138/129
[58] Field of Search .................. 174/47; 138/122, 129,
138/131, 132, 133, 137, 138, 139, 144, 153;
156/143, 144

[56] References Cited

FOREIGN PATENT DOCUMENTS

| 862660 | 3/1961 | United Kingdom | 174/47 |
| 1019370 | 2/1966 | United Kingdom | 138/122 |
| 1310737 | 3/1973 | United Kingdom | 174/47 |

*Primary Examiner*—Laramie E. Askin
*Attorney, Agent, or Firm*—Francis N. Carten

[57] ABSTRACT

A helically fabricated flexible hose having two reinforcing wires which also serve as electrical conductors and a multiple-ply wall which is thicker over the wire convolutions than between them and is reinforced with cords within the wall plies.

6 Claims, 2 Drawing Figures

DUAL WIRE HOSE

BACKGROUND OF THE INVENTION

It has long been recognized that wire reinforced flexible hose can be modified so that the helical wire serves as an electrical conductor as well as a structural member. This is particularly useful in vacuum cleaner devices where an electrically operated component such as a brush at the remote end of the hose receives its power through the hose wall rather than through a separate conductor. See for example U.S. Pat. No. 2,890,264.

More recently, a design of such a hose has been proposed with two parallel helical wires, each insulated with plastic, and with a single ply wall of flexible plastic disposed about the wire convolutions. Such a double lead structure is shown in U.S. Pat. Nos. 3,636,285 and 3,928,715. Hose of this form is typically somewhat stiff and has less than satisfactory abrasive resistance, particularly on the raised convolutions over the wires. A certain degree of added strength is provided in another form of prior art hose where a side-by-side pair of insulated helical wires are covered by two uniformly thick plastic wall plies with helical and longitudinal reinforcing cords between the plies. This is a single lead, rather than a double lead, structure and hence the total amount of wire is quite large, resulting not only in added weight but in increased voltage drop as well.

The double-wire single lead hose referred to has been manufactured on a continuously advancing definite length mandrel device as shown in U.S. Pat. No. 3,155,559, in which a helical belt forms the mandrel surface. This mandrel device has itself been modified as described in a pending application, Ser. No. 903,772, filed May 10, 1978, entitled "Continuously Advancing Mandrel" and it is characterized by two belts wound side by side to form the mandrel surface. Each time the mandrel turns once a point on its surface advances a distance equal to two belt widths in a double lead manner. This new mandrel makes possible the manufacture of improved double wire hose designs of which the present invention is one.

SUMMARY OF THE INVENTION

The invention provides a helically fabricated flexible hose wherein first and second parallel helical wires are disposed in double lead fashion with successive convolutions alternating. An inner plastic strip is wrapped helically about the wires and is wider than the double lead of each wir, so that it has forward and rearward edge portions overlapping over convolutions of the first of the wires. An outer plastic strip is wraped helically about the reinforcing cords and is wider than the double lead of each wire with forward and rearward edge portions overlapping over convolutions of the second of the wires. In a preferred form a plastic dielectric coating is disposed about each wire and a plurality of reinforcing cords are located about the inner strip and inside the outer strip, the plastic coatings and the two strips all being bonded together.

It is characteristic of this structure that each wire convolution is covered by three wall plies, two from one strip and one from the other, with only two wall plies between the wire convolutions, thus imparting markedly better abrasion resistance at the raised convolutions where the greatest wear occurs. Unlike the single lead double-wire hose referred to previously, the hose of the invention is of uniform double lead double-wire form, so that the amount of wire per unit length of hose is at a minimum. Each wire helix flexes independently of the other and the structure therefore possesses exceptional flexibility allowing it to drape readily with close bend radius, all of which is important for vacuum cleaner hose.

Other objectives and advantages of the invention will become apparent in the following description of a preferred embodiment taken in conjunction with the accompanying drawing.

DESCRIPTION OF PREFERRED EMBODIMENT

Figure 1:
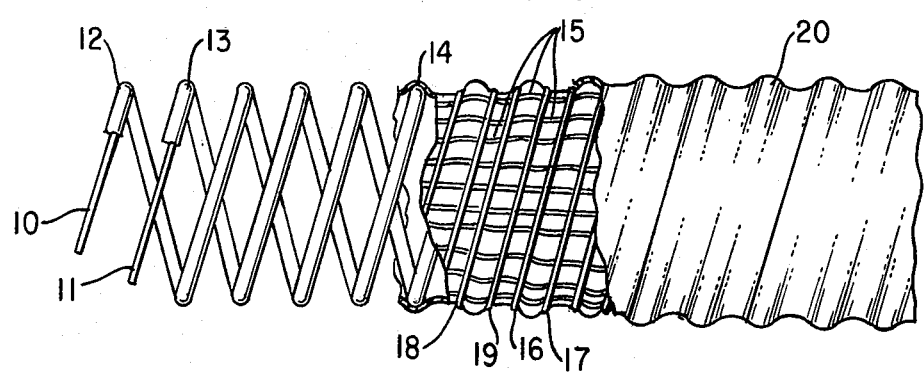
FIG. 1 is an elevation partly broken away of a dual wire hose of the invention.
Figure 2:
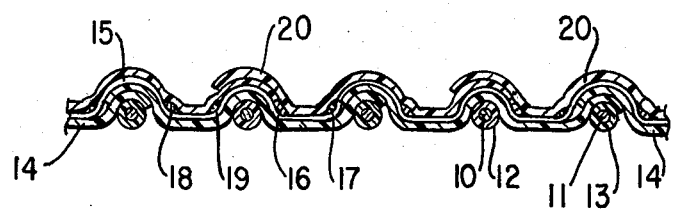
FIG. 2 is an enlarged section of the wall of the hose.

All of the various components of the hose of the invention are most advantageously assembled on the continuously advancing double belt mandrel device referred to previously. Such mandrels are of a diameter range from 1.25" to 1.50" and form hose of corresponding inside dimensions. The elements initially applied to the mandrel are first and second wires 10 and 11. Each wire preferably has a steel core and a copper coating in typical diameters from 0.048" to 0.062". The copper content of such wires is usually between 10 and 35 percent by weight. The function of the pair of wires in the finished product is to provide a flexible self-supporting skeleton for the hose and at the same time a pair of electrical conductors which can carry current to the end of the hose.

Each of the two wires 10 and 11 has a helical pitch in the order of 0.435" for current carrying purposes. It is to be emphasized, however, that the invention is applicable to hose which is non-current carrying and in such cases the pitch of each of the wires is somewhat less, perhaps in the order of 0.325" to 0.390". Each of the wires 10 and 11 is coated with a concentric layer of vinyl plastic 12 and 13 respectively, the thickness of which is in the order of 0.032". It is the purpose of this plastic coating to provide a bondable surface about which the body of the hose is formed and also to provide electrical insulation.

The next element disposed about the pair of helical wires 10 and 11 is an inner vinyl, or vinyl blend with other polymers, plastic strip 14 which is applied with heat or a solvent or both so that it bonds to the coatings 12 and 13. It is wrapped about the wires on the mandrel under tension and at an elevated temperature directly from an extrusion head, so that the inner strip 14 stretches snugly over and between the convolutions of the wires 10 and 11. The extrusion die may appropriately be cross-sectioned to provide a preformed shape to the strip which conforms to the pair of wires and the mandrel surface. The die design may also impart feathered or tapered edges to the strip so that the overlapping edges fair smoothly into one another.

In thickness the inner strip 14 is in the range 0.014" to 0.020". The width of the inner plastic strip is slightly greater than the double lead of the pair of wires 10 and 11. As shown on the drawing, the rearward edge of the strip 14 thereby overlies the first wire 10, the central portion of the strip 14 overlies the next adjoining convolution of the second wire 11, and the forward edge of the strip 14 overlies the following convolution of the first wire 10. In this manner the rearward edge of the strip 14 is in direct contact with and bonds to the wire 10 and the forward edge of the strip 14 is indirect contact with and bonds to the rearward edge of the strip 14 on the next convolution of that same wire 10.

After application of the inner strip 14 a plurality of longitudinal cords 15 are applied to the structure. The cords may be of polyester of a size approximately 1100 denier. They are uniformly spaced around the circumference of the hose and are typically from nine to thirty-six in number depending upon the size of hose. They may be precisely parallel to the axis of the mandrel, and thus of the finished hose as well, or they may be applied at a very slight included angle to the mandrel axis. In any event, they are at least substantially longitudinal with respect to the hose structure because it is their purpose to lend longitudinal strength to the product and prevent if from being stretched to the point of damaging the plastic wall of the hose. The longitudinal cords 15 permit the use of softer wall materials, i.e., having more plasticity, thus providing better flexibility in the finished product with equal or better strength.

To lock the longitudinal cords in place against the inner plastic strip, four strands of helical cords 16 through 19 are applied. The helical cords 16 and 17 are applied snugly to each side of the first wire 10 and the other pair of helical cords 18 and 19 are similarly applied with respect to the second wire 11. They pull the plurality of longitudinal cords 15 dowwardly between the convolutions of the reinforcing wires so that the helical and longitudinal cords together assume the same helically convoluted form of the inner strip 14. The composition and size of the helical cords 16 through 19 may be selected as mentioned above with respect to the longitudinal cords depending upon the purpose of the final product.

The last element applied to the mandrel in forming the hose of the invention is an outer vinyl plastic strip 20 which may be of the same width and thickness as the inner plastic strip 14. It overlaps itself over the second wire 11, forward edge portion overlying rearward edge portion, while the central portion overlies the first wire 10. By the use of heat or solvents or both the outer strip is bonded to the inner strip with the longitudinal and helical cords 15 to 19 embedded there between.

In its finished form the total wall thickness of the hose may be from 0.028" to 0.040" between the wire convolutions where it is of two-ply thickness, and half again as much over the convolutions where maximum wear occurs. A variation which should be apparent is that the inner and outer strips 14 and 20 may be of dissimilar materials, the inner being selected for example for chemical resistance and the outer for abrasion resistance or aesthetic quality.

As a consequence of these many features a dual wire current carrying hose construction is provided which is of maximum flexibility and abrasion resistance, optimum longitudinal and radial strength, and minimal wire weight and voltage resistance. The scope of the invention is not to be limited to the specific embodiment here described, but rather to the following claims.

We claim:

1. A helically fabricated flexible hose comprising
   (a) first and second parallel helical wires disposed in double lead fashion with successive convolutions alternating,
   (b) an inner plastic strip wrapped helically about said wires with forward and rearward edge portions of said inner plastic strip overlapping convolutions of the first of said wires, and
   (c) an outer plastic strip wrapped helically about said inner plastic strip with forward and rearward edge portions of said outer plastic strip overlapping convolutions of the second of said wires and, with said inner plastic strip, forming a multiple-ply wall which is thicker over said wire convolutions than between them.

2. A flexible hose according to claim 1 wherein a plurality of reinforcing cords are disposed between said inner and outer plastic strips.

3. a flexible hose according to claim 1 wherein each of said wires is capable of carrying electrical current and has a coating of dielectric plastic.

4. A helically fabricated flexible hose comprising
   (a) first and second parallel helical wires disposed in double lead fashion with successive convolutions of equal diameter alternating and equally spaced,
   (b) an inner plastic strip wrapped helically about said wires with forward and rearward edge portions of said inner plastic strip overlapping convolutions of the first of said wires,
   (c) a plurality of longitudinal and helical reinforcing cords disposed over said inner plastic strip, and
   (d) an outer plastic strip wrapped helically about said reinforcing cords with forward and rearward edge portions of said outer plastic strip overlapping convolutions of the second of said wires and, with said inner plastic strip, forming a multiple-ply wall which is thicker over said wire convolutions than between them.

5. A helically fabricated flexible hose comprising
   (a) first and second parallel helical current-carrying wires disposed in double lead fashion with successive convolutions of equal diameter alternating and equally spaced,
   (b) a coating of dielectric plastic about each of said wires,
   (c) an inner plastic strip wrapped helically about said wires, said inner plastic strip comprising
      (i) rearward and forward edge portions overlapping one another over the convolutions of the first of said pair of wires, and
      (ii) a central portion overlapping the intermediate convolution of the second of said wires,
   (d) a plurality of longitudinal reinforcing cords disposed in equal circumferential spacing about said inner plastic strip,
   (e) respective pairs of helical reinforcing cords wrapped about said inner plastic strip adjacent each of the convolutions of the respective wires and holding said longitudinal cords against said inner plastic strip, and
   (f) an outer plastic strip wrapped helically about said reinforcing cords, said outer plastic strip comprising
      (i) rearward and forward edge portions overlapping the convolutions of the second of said wires,
      (ii) a central portion overlapping the intermediate convolution of the first of said wires,
   and, with said inner plastic strip, forming a multiple-ply wall which is thicker over said wire convolutions than between them.

6. A helically fabricated flexible hose comprising
   (a) first and second parallel helical wires disposed in double lead fashion with successive convolutions of equal diameter alternating and equally spaced, each of said wires comprising
  (i) an inner steel core, and
  (ii) an outer copper coating,
(b) a coating of dielectric plastic about each of said wires,
(c) an inner plastic strip wrapped helically about said wires, said inner plastic strip comprising
  (i) rearward and forward edge portions overlapping and bonded to one another over the convolutions of the first of said wires, and
  (ii) a central portion overlapping the intermediate convolution of the second of said wires, and
  (iii) said rearward edge portion of said inner plastic strip being bonded to the plastic coating of said wires,
(d) a plurality of longitudinal reinforcing cords disposed in equal circumferential spacing about said inner plastic strip,
(e) respective pairs of helical reinforcing cords wrapped about said inner plastic strip adjacent each of the convolutions of the respective wires and holding said longitudinal cords against said inner plastic strip, and
(f) an outer plastic strip wrapped helically about said reinforcing cords, said outer plastic strip comprising
  (i) rearward and forward edge portions overlapping and bonded to one another over the convolutions of the second of said wires,
  (ii) a central portion overlapping the intermediate convolution of the first of said wires, and
  (iii) said rearward edge portion of said outer plastic strip being bonded to the central portion of said inner plastic strip,
and, with said inner plastic strip, forming a multiple-ply wall which is thicker over said wire convolutions than between them.

* * * * *